United States Patent
Meng et al.

(10) Patent No.: US 11,501,099 B2
(45) Date of Patent: Nov. 15, 2022

(54) CLUSTERING METHOD AND DEVICE

(71) Applicant: Beijing Xiaomi Intelligent Technology Co., Ltd., Beijing (CN)

(72) Inventors: Qingchun Meng, Beijing (CN); Peixia Sun, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 459 days.

(21) Appl. No.: 16/693,372

(22) Filed: Nov. 25, 2019

(65) Prior Publication Data
US 2021/0004638 A1    Jan. 7, 2021

(30) Foreign Application Priority Data

Jul. 3, 2019    (CN) .......................... 201910596213.8

(51) Int. Cl.
*G06K 9/62* (2022.01)
*G06F 16/906* (2019.01)
*G06N 5/04* (2006.01)

(52) U.S. Cl.
CPC ......... *G06K 9/6218* (2013.01); *G06F 16/906* (2019.01); *G06K 9/6215* (2013.01); *G06N 5/048* (2013.01)

(58) Field of Classification Search
CPC .. G06K 9/6218; G06K 9/6215; G06F 16/906; G06F 16/285; G06N 5/048
See application file for complete search history.

(56) References Cited

U.S. PATENT DOCUMENTS

2016/0283826 A1*   9/2016   Zhou ................... G06K 9/6221
2019/0130017 A1    5/2019   B
(Continued)

FOREIGN PATENT DOCUMENTS

CN    101576892 A    11/2009
CN    101834981 A    9/2010
(Continued)

OTHER PUBLICATIONS

Dang et al. ReBucket: A Method for Clustering Duplicate Crash Reports Based on Call Stack Similarity, Published in: 2012 34th International Conference on Software Engineering (ICSE), Publisher: IEEE, Jun. 2-9, 2012.*
(Continued)

*Primary Examiner* — Chan S Park
*Assistant Examiner* — Elisa M Rice
(74) *Attorney, Agent, or Firm* — Syncoda LLC; Feng Ma

(57) ABSTRACT

A clustering method includes: multiple data to be clustered are acquired, the data to be clustered including exact matching information; multiple data sets consisting of data to be clustered with same exact matching information are determined; a clustering center is determined according to the amount of data to be clustered in each of the multiple data sets; and the multiple data to be clustered are clustered according to the clustering center to obtain target clusters. Accordingly, multiple data sets each consisting of data to be clustered with same exact matching information are determined, and a clustering center is determined according to the amount of the data to be clustered in each of the multiple data sets, so that unreasonable determination of the clustering centers can be improved, and accuracy of a clustering algorithm can further be improved.

17 Claims, 7 Drawing Sheets

(56) References Cited

U.S. PATENT DOCUMENTS

| | | | |
|---|---|---|---|
| 2019/0138652 A1 | 5/2019 | Miranda et al. | |
| 2020/0154392 A1* | 5/2020 | Zhang | H04W 76/11 |

FOREIGN PATENT DOCUMENTS

| | | | |
|---|---|---|---|
| CN | 103559502 A | 2/2014 |
| CN | 104731916 A | 6/2015 |
| CN | 106778812 A | 5/2017 |
| CN | 107067045 A | 8/2017 |
| CN | 107562853 A | 1/2018 |
| CN | 108536753 A | 9/2018 |
| CN | 108734217 A | 11/2018 |
| CN | 109446520 A | 3/2019 |
| CN | 109685092 A | 4/2019 |
| CN | 109961851 A | 7/2019 |

OTHER PUBLICATIONS

Cao Yixi,etc.,"Translucent material estimation based on color histogram matching",Journal of Computer-Aided Design & Computer Graphics,vol. 27 No.3, Mar. 30, 2015.

Lin Muyun,"Application of Edge Cloud in the Power and Environment Monitoring System",Information Technology Series,2018.

Second Office Action of the Chinese application No. 201910596213.8, dated May 31, 2021.

Kiri Wagstaf, Claire Cardie. Constrained K-means Clustering with Background Knowledge. Proceedings of the Eighteenth International Conference on Machine Learning, 2001, p. 577-584.

Hartigan, J. A. Wong, M. A. Algorithm AS 136: A k-Means Clustering Algorithm Journal of the Royal Statistical Society, Series C. 1979, 28 (1): 100-108. JSTOR 2346830.

Chen Li-Fei et al. A Hierarchical Method for Determining the Number of Clusters. Journal of Software, vol. 19, No. 1, Jan. 2008, pp. 62-72.

Khan Shehroz S et al: "Cluster center initialization algorithm for K-modes clustering", Expert Systems With Applications, Oxford, GB vol. 40, No. 18, Jul. 16, 2013 (Jul. 16, 2013), pp. 7444-7456, XP028704623, ISSN: 0957-4174, DOI: 10.1016/J. ESWA.2013.07.002 * p. 7446, right-hand column, lines 1-37 * * p. 7449, left-hand column, line 26—right-hand column, line 50 *.

Zhexue Huang: "A Fast Clustering Algorithm to Cluster Very Large Categorical Data Sets in Data Mining", Proceedings of the Workshop On Research Issues On Data Mining and Knowledge Discovery, DMKD 1997 In Cooperation WithACM SIGMOD ' 97, Tucson, Arizona, USA, May 11, 1997., May 11, 1997 (May 11, 1997), XP055696945, * p. 3, left-hand column, line 6—p. 5, left-hand column, line 8 *.

Supplementary European Search Report in the European application No. 19216191.7, dated Jun. 3, 2020.

Notice of Allowance of the Chinese application No. 201910596213.8, dated Mar. 10, 2022.

Yang Keguang "Research on incremental clustering method for large dataset" <<Modern Electronics Technique>> vol. 40, No. 9, May 1, 2017.

Xu Xiaolong etc. "Multi-document summarization algorithm based on topic clustering"Journal of Nanjing University of Posts and Telecommunications ( Natural Science Edition), Oct. 31, 2018.

Jia Bin etc. "An Improved K-Modes Clustering Algorithm" «Software Guide» Jun. 30, 2019.

Matthew Kellom etc. "Using cluster edge counting to aggregate iterations of centroid-linkage clustering results and avoid large distance matrices" «Journal of Biological Methods» Mar. 16, 2017.

Chris Ding etc. "Linearized Cluster Assignment via Spectral Ordering"Sep. 30, 2004.

* cited by examiner

CLUSTERING METHOD AND DEVICE

CROSS-REFERENCE TO RELATED APPLICATION

This application claims priority to Chinese patent application No. 201910596213.8 filed on Jul. 3, 2019, the disclosure of which is hereby incorporated by reference in its entirety.

BACKGROUND

Clustering refers to a process of dividing a set of physical or abstract objects into multiple types which respectively consist of similar objects. Clustering is an important research direction of data mining and is extensively applied to the fields of image analysis, text retrieval, mode recognition, artificial intelligence and the like.

SUMMARY

The present disclosure generally relates to the technical field of data mining, and more specifically to a clustering method and device.

According to a first aspect of the embodiments of the present disclosure, a clustering method is provided, which may include:

multiple data to be clustered are acquired, each of the multiple data to be clustered including exact matching information;

multiple data sets consisting of data to be clustered with same exact matching information are determined;

a clustering center is determined according to the amount of data to be clustered in each of the multiple data sets; and the multiple data to be clustered are clustered according to the clustering center to obtain target clusters.

According to a second aspect of the embodiments of the present disclosure, a clustering device is provided, which may include a processor, and a memory configured to store instructions executable by the processor, wherein the processor is configured to:

control a network interface to acquire multiple data to be clustered, each of the multiple data to be clustered including exact matching information;

determine multiple data sets each consisting of data to be clustered with same exact matching information;

determine a clustering center according to the amount of the data to be clustered in each of the multiple data sets; and cluster the multiple data to be clustered according to the clustering center to obtain target clusters.

According to a third aspect of the embodiments of the present disclosure, a computer-readable storage medium is provided, in which a program has been stored, wherein the program is for execution by a processor of a terminal to enable the terminal to implement the following operations of:

acquiring multiple data to be clustered, each of the multiple data to be clustered comprising exact matching information;

determining multiple data sets consisting of data to be clustered with same exact matching information;

determining a clustering center according to the amount of data to be clustered in each of the multiple data sets; and clustering the multiple data to be clustered according to the clustering center to obtain target clusters.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
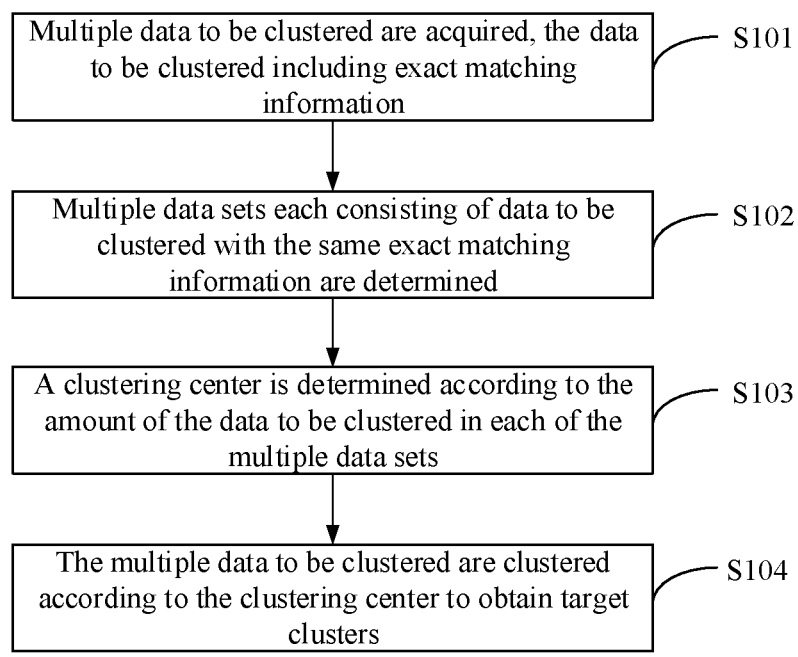
FIG. 1 is a flowchart illustrating a clustering method according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Terms used in the present disclosure are only adopted for the purpose of describing specific embodiments and not intended to limit the present disclosure. "A/an," "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms "first" "second" "third" and the like may be adopted to describe various information in the present disclosure, the information should not be limited to these terms. These terms are only adopted to distinguish the information of the same type. For example, without departing from the scope of the present disclosure, first information may also be called second information and, similarly, second information may also be called first information. For example, term "if" used here may be explained as "while" or "when" or "responsive to determining", which depends on the context.

Commonly used clustering methods mainly include a division-based method, a layer-based method, a density-based method, a grid-based method and a model-based method. A K-means (also called K-means) method is one of classical division-based clustering methods adopted at present. The basic idea is that clustering is performing of taking k points in space as initial clustering centers, objects nearest to the clustering centers are classified and a value of each clustering center is updated gradually through an iteration algorithm until a satisfactory clustering result is obtained.

However according to the solution in which initial clustering centers are specified, it cannot be ensured that the selected initial clustering centers may represent a real situation of data, and the speed clustering and accuracy of the clustering result may be affected.

FIG. 1 is a flowchart illustrating a clustering method according to some embodiments of the present disclosure. The embodiments can be applied to a server (for example, a server and a server cluster consisting of multiple servers) with a data processing function. As shown in FIG. 1, the method includes operations S101 to S104.

In S101, multiple data to be clustered are acquired, the data to be clustered including exact matching information.

In some embodiments, each of the acquired multiple data to be clustered may include exact matching information, and further, each of the multiple data to be clustered can be classified based on whether the exact matching information is completely the same or not.

In some embodiments, the type of the data to be clustered can be set by a developer according to a practical service requirement. There are no limits made thereto in the embodiments.

In some embodiments, the data to be clustered may include program stack information. Based on this, the exact matching information may include an abnormality type of the program stack information, a name of a program packet with an abnormality and the like. There are no limits made thereto in the embodiments.

In S102, multiple data sets each consisting of data to be clustered with the same exact matching information are determined.

In some embodiments, after the multiple data to be clustered including the exact matching information are acquired, multiple data sets each consisting of the data to be clustered with the same exact matching information can be determined. That is, the multiple data to be clustered in the same data set has the same exact matching information.

For example, after the multiple data to be clustered are acquired, the multiple data to be clustered can be divided according to the exact matching information to obtain multiple data sets which are respectively constituted by the data to be clustered with the same exact matching information.

In S103, a clustering center is determined according to the amount of the data to be clustered in each of the multiple data sets.

In some embodiments, after the multiple data sets which are respectively constituted by the data to be clustered with the same exact matching information are determined, a clustering center can be determined according to the amount of the data to be clustered in each of the multiple data sets.

In some embodiments, after the multiple data sets are determined, the amount of the data to be clustered in each of the multiple data sets can be statistically obtained, and a clustering center may further be determined according to the amount of the data to be clustered in the multiple data sets.

Figure 2:
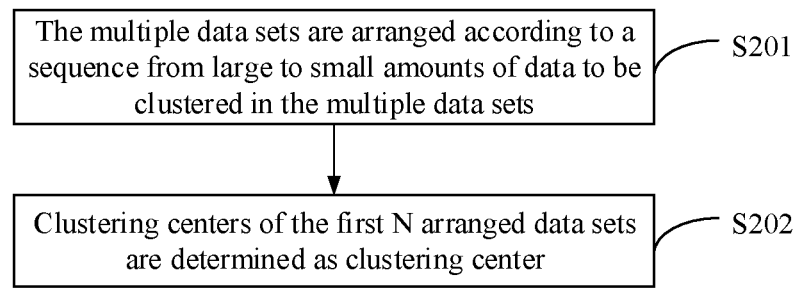
FIG. 2 is a flowchart illustrating how to determine a clustering center according to some embodiments of the present disclosure.

In some embodiments, how to determine a clustering center according to the amount of the data to be clustered in each of the multiple data sets may also refer to the embodiments shown in FIG. 2 and will not be elaborated herein.

In S104, the multiple data to be clustered are clustered according to the clustering center to obtain target clusters.

In some embodiments, after the clustering center is determined according to the amount of the data to be clustered in each of the multiple data sets, the multiple data to be clustered can be clustered according to the clustering center to obtain target clusters.

Figure 3:
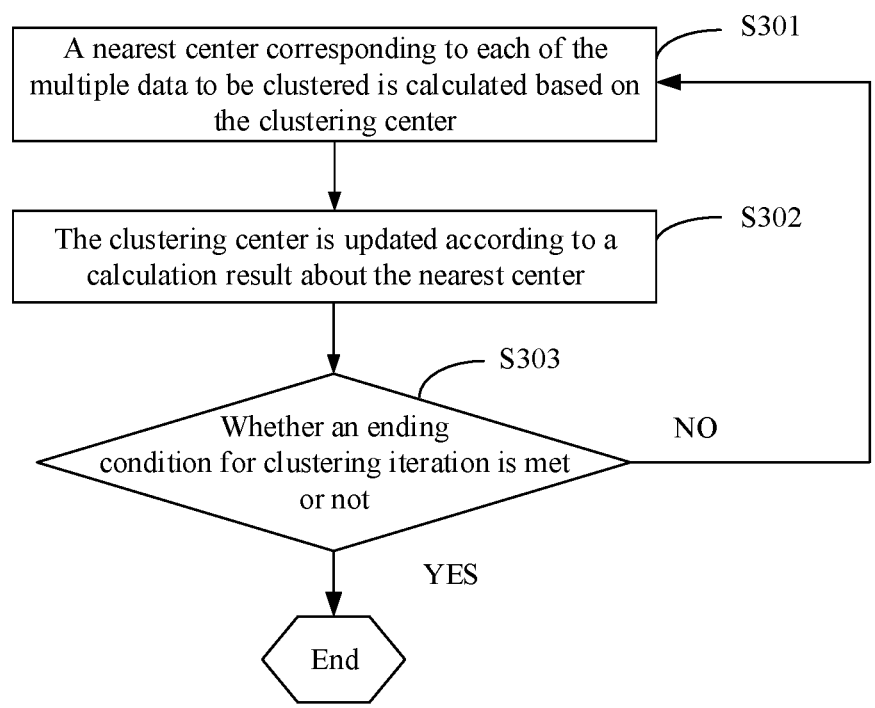
FIG. 3 is a flowchart illustrating how to cluster multiple data to be clustered according to some embodiments of the present disclosure.

In some embodiments, how to cluster the multiple data to be clustered according to the clustering center may refer to the embodiments shown in FIG. 3 and will not be elaborated herein.

It can be seen from the above descriptions that according to the embodiments, multiple data to be clustered can be acquired, multiple data sets respectively consisting of the data to be clustered with the same exact matching information can be determined, then a clustering center can be determined according to the amount of the data to be clustered in each of the multiple data sets, and further the multiple data to be clustered can be clustered according to the clustering center to obtain target clusters. Since multiple data sets consisting of the data to be clustered with the same exact matching information can be determined and a clustering center can be determined according to the amount of the data to be clustered in each of the multiple data sets, unreasonable determination of a clustering center can be improved, and accuracy of a clustering algorithm may further be improved.

FIG. 2 is a flowchart illustrating how to determine clustering centers according to some embodiments of the present disclosure. In the embodiments, descriptions are made with how to determine the clustering centers as an example based on the above-mentioned embodiments. As shown in FIG. 2, the operation in S103 that the clustering center is determined according to the amount of the data to be clustered in each of the multiple data sets may include the following S201 to S202.

In S201, the multiple data sets are arranged according to a sequence from large to small amounts of the data to be clustered in the multiple data sets.

In some embodiments, after the multiple data sets consisting of the data to be clustered with the same exact matching information are determined, the multiple data sets can be arranged according to the sequence from large to small amounts of the data to be clustered in the multiple data sets.

For example, after the multiple data sets consisting of the data to be clustered with the same exact matching information are determined, the amount of the data to be clustered in each of the multiple data sets can be statistically obtained, and the multiple data sets can be arranged according to the sequence from large to small amounts of the data to be clustered in the multiple data sets.

In S202, clustering centers of the first N arranged data sets are determined as the clustering center.

In some embodiments, after the multiple data sets are arranged according to the sequence from large to small amounts of the data to be clustered in the multiple data sets, the clustering centers of the first N arranged data sets can be determined as the clustering center.

In some embodiments, N is a positive integer, and a specific value thereof can be set by a developer according to a practical service requirement, for example, set to be 50, 100 or 200. There are no limits made thereto in the embodiments.

In some embodiments, the value of N may also be set based on the number of clustering centers. There are no limits made thereto in the embodiments.

In some embodiments, after the first N arranged data sets are determined, the clustering center of each set in the N data sets can be determined, and then the N clustering centers can be determined as the clustering centers for clustering of the multiple data to be clustered.

In some embodiments, a manner for calculating a clustering center of each set can be set by a developer according to a service requirement. For example, a mean value of the multiple data to be clustered in each set can be calculated to determine the clustering center, or the multiple data to be clustered in each set can be clustered by an existing clustering method to obtain the clustering center. There are no limits made thereto in the embodiments.

It can be seen from the above descriptions that according to the embodiments, multiple data sets can be arranged according to a sequence from large to small amounts of the data to be clustered in the multiple data sets, and the clustering centers of the first N arranged data sets can be determined as clustering centers, so that the clustering centers can be determined based on the multiple data sets including relatively large amounts of data to be clustered. Since random setting of clustering centers is avoided, the unreasonable determination of the clustering centers is improved, and the accuracy of the clustering algorithm may further be improved.

FIG. 3 is a flowchart illustrating how to cluster multiple data to be clustered according to some embodiments of the present disclosure. In the embodiments, descriptions are made with how to cluster multiple data to be clustered as an example based on the above-mentioned embodiments. As shown in FIG. 3, the operation in S104 that the multiple data to be clustered are clustered according to the clustering center may include the following S301 to S303.

In S301, a nearest center corresponding to each of the multiple data to be clustered is calculated based on the clustering center.

In some embodiments, after the clustering center is determined according to the amount of the data to be clustered in each of the multiple data sets, a nearest center corresponding to each of the multiple data to be clustered can be calculated based on the clustering center.

In some embodiments, the nearest center may include a clustering center nearest to each data to be clustered in the clustering centers.

For example, after the clustering centers are determined, a distance between each of the multiple data to be clustered and each clustering center can be determined, and a clustering center at a shortest distance can be determined as the nearest center of the data to be clustered.

In some embodiments, the data to be clustered may further include fuzzy matching information. Furthermore, under the circumstance that the exact matching information of multiple data to be clustered is determined to be the same, the multiple data to be clustered may further be classified based on whether the fuzzy matching information is similar or not (for example, whether a distance between pieces of fuzzy matching information is smaller than or equal to a preset threshold or not).

For example, if the data to be clustered is program stack information, the fuzzy matching information may include function backtrace information and the like of a program. There are no limits made thereto in the embodiments.

Based on this, S301 may include that:

a nearest center corresponding to an information vector of each of the multiple data to be clustered is calculated based on an information vector of the clustering center, the information vector being generated based on the exact matching information and fuzzy matching information of the data to be clustered.

For example, after the clustering center is determined, the information vector of the clustering center can be generated based on exact matching information and fuzzy matching information of the clustering center, the information vector of each piece of data to be clustered can be generated based on the exact matching information and fuzzy matching information of each piece of data to be clustered, and the nearest center corresponding to the information vector of each piece of data to be clustered can be calculated based on the information vector of the clustering center.

In some embodiments, the information vector of the clustering center and the information vector of the data to be clustered, which have the same length, can be generated based on a preset embedding model, and the operation that the nearest center corresponding to the information vector of each piece of data to be clustered is calculated based on the information vector of the clustering center can be implemented.

It can be understood that the information vector of the clustering center and the information vector of each piece of data to be clustered are generated and then the nearest center corresponding to the information vector of each piece of data to be clustered can be calculated based on the information vector of the clustering center, so that vectorization of the data to be clustered can be implemented, and the speed of a subsequent clustering operating may further be increased.

In S302, the clustering center is updated according to a calculation result about the nearest center.

In some embodiments, after the nearest center corresponding to each of the multiple data to be clustered is calculated, the clustering center can be updated according to the calculation result about the nearest center.

In some embodiments, after the nearest center corresponding to each piece of data to be clustered is calculated, the clustering center can be recalculated according to multiple data to be clustered corresponding to each nearest center, and the clustering center determined before can be updated based on the recalculated clustering center.

In S303, whether an ending condition for clustering iteration is met or not is judged, if the ending condition is met, clustering iteration is ended, and if not met, S301 is re-executed.

It can be seen from the above descriptions that according to the embodiments, a nearest center corresponding to each of the multiple data to be clustered can be calculated based on the clustering center, the clustering center can be updated according to the calculation result about the nearest center and then the operation that a nearest center corresponding to each of the multiple data to be clustered is calculated based on the clustering center can be re-executed until the ending condition for clustering iteration is met. In such a manner, the clustering center can be updated for many times, and the multiple data to be clustered can be clustered according to the clustering center, so that clustering accuracy can be improved.

Figure 4:
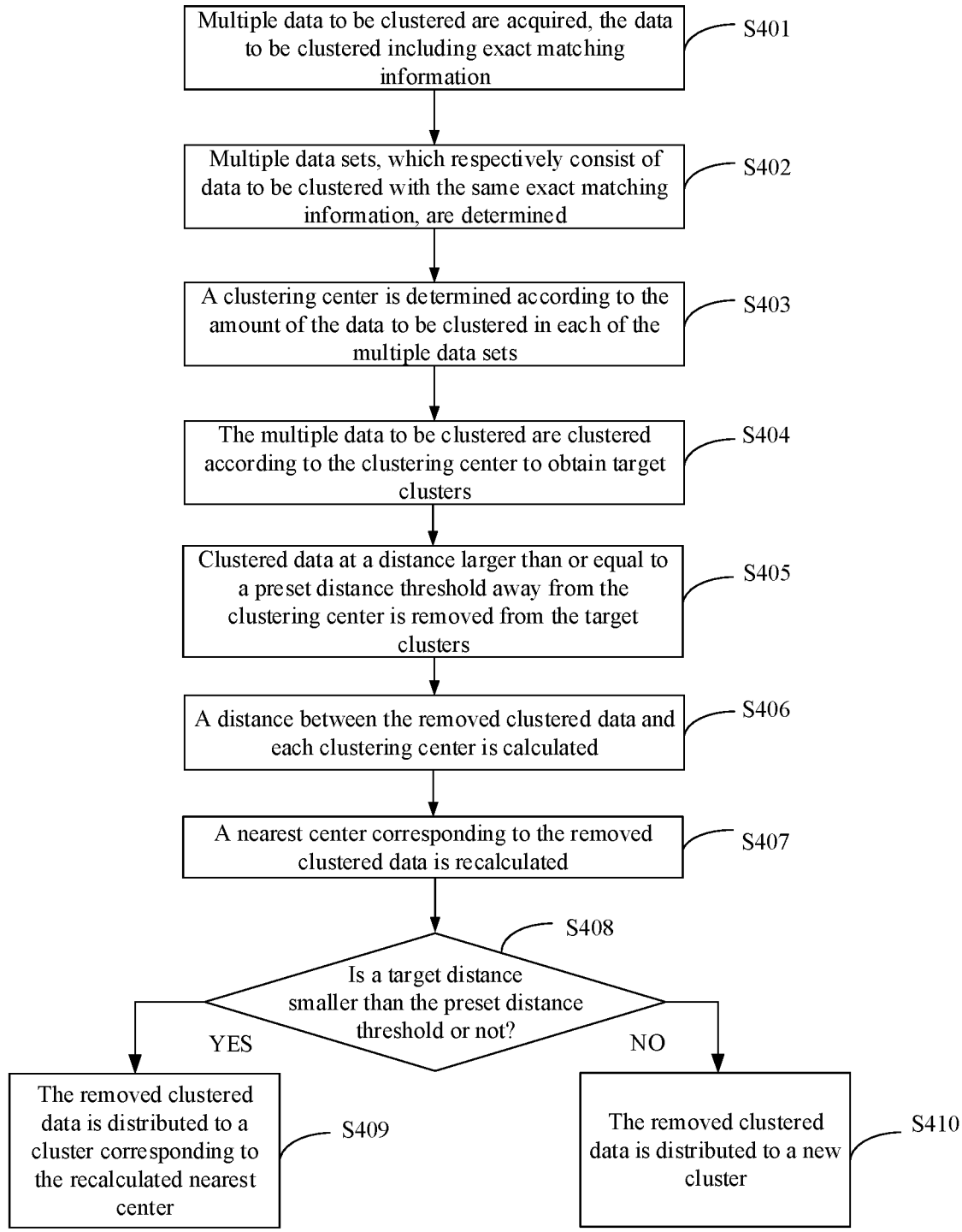
FIG. 4 is a flowchart illustrating a clustering method according to another some embodiments of the present disclosure.

FIG. 4 is a flowchart illustrating a clustering method according to another some embodiments of the present disclosure. The embodiments can be applied to a server (for example, a server and a server cluster consisting of multiple servers) with a data processing function. As shown in FIG. 4, the method includes following operations S401 to S410.

In S401, multiple data to be clustered are acquired, the data to be clustered including exact matching information.

In S402, multiple data sets, which respectively consist of data to be clustered with the same exact matching information, are determined.

In S403, a clustering center is determined according to the amount of the data to be clustered in each of the multiple data sets.

In S404, the multiple data to be clustered are clustered according to the clustering center to obtain target clusters.

Related explanations and descriptions about S401 to S404 may refer to the above-mentioned embodiments and elaborations are omitted herein.

In S405, clustered data at a distance larger than or equal to a preset distance threshold away from the clustering center is removed from the target clusters.

In some embodiments, after the multiple data to be clustered are clustered according to the clustering center to obtain the target clusters, the clustered data at the distance larger than or equal to the preset distance threshold away from the clustering center in each target cluster can be determined.

In some embodiments, the preset distance threshold can be set by a developer according to a practical requirement or a service experience. There are no limits made thereto in the embodiments.

In some embodiments, after the clustered data at the distance larger than or equal to the preset distance threshold away from the clustering center in each target cluster is determined, the clustered data at the distance larger than or equal to the preset distance threshold away from the clustering center can be removed from the target clusters, namely data in the target clusters can be "pruned", and the clustering center may subsequently be redetermined based on the "pruned" target clusters, so that clustering accuracy is improved.

In S406, a distance between the removed clustered data and each clustering center is calculated.

In some embodiments, after the clustered data at the distance larger than or equal to the preset distance threshold away from the clustering center is removed from the target clusters, the distance between the removed clustered data and each clustering center can be calculated.

In S407, a nearest center corresponding to the removed clustered data is recalculated.

In some embodiments, after the distance between the removed clustered data and each clustering center is calculated, the nearest center corresponding to the removed clustered data can be recalculated based on the distance.

In some embodiments, a manner for calculating the nearest center corresponding to the removed clustered data is the same as the manner for calculating the nearest center corresponding to the data to be clustered, specific explanations and descriptions may refer to the above-mentioned embodiments and elaborations are omitted herein.

In S408, whether a target distance is smaller than the preset distance threshold or not is judged; if smaller, S409 is executed, and if not, S410 is executed, the target distance being a distance between the recalculated nearest center and the removed clustered data.

In S409, the removed clustered data is distributed to a cluster corresponding to the recalculated nearest center.

In S410, the removed clustered data is distributed to a new cluster.

In some embodiments, after the nearest center corresponding to the removed clustered data is recalculated, whether the target distance between the recalculated nearest center and the removed clustered data is smaller than the preset distance threshold or not can be judged; if smaller, the removed clustered data can be distributed to a cluster corresponding to the recalculated nearest center, otherwise, the removed clustered data can be distributed to a new cluster, namely the new cluster can be generated based on the removed clustered data.

It can be seen from the above descriptions that according to the embodiments, the clustered data at the distance larger than or equal to the preset distance threshold away from the clustering center can be removed from the target clusters, so that accuracy of the data in the target clusters can be improved. Furthermore, the distance between the removed clustered data and each clustering center can be calculated, the nearest center corresponding to the removed clustered data can be recalculated, and when the target distance between the recalculated nearest center and the removed clustered data is smaller than the preset distance threshold, the removed clustered data can be distributed to the cluster corresponding to the recalculated nearest center, and when the target distance is larger than or equal to the preset distance threshold, the removed clustered data can be distributed to the new cluster, so that the clustered data can be distributed more reasonably, and clustering accuracy may further be improved.

Figure 5:
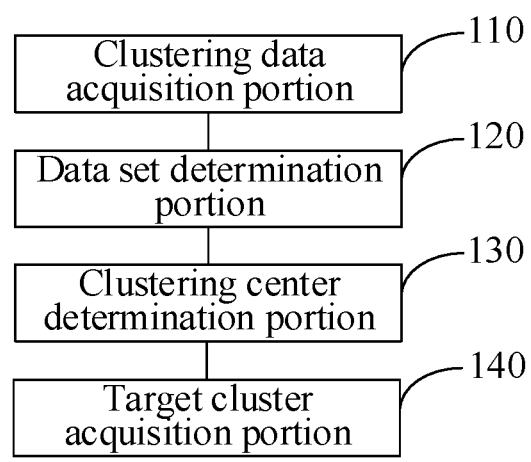
FIG. 5 is a block diagram of a clustering device according to some embodiments of the present disclosure.

FIG. 5 is a block diagram of a clustering device according to some embodiments of the present disclosure. As shown in FIG. 5, the device includes a clustering data acquisition portion 110, a data set determination portion 120, a clustering center determination portion 130 and a target cluster acquisition portion 140.

The clustering data acquisition portion 110 is configured to acquire multiple data to be clustered, the data to be clustered including exact matching information.

The data set determination portion 120 is configured to determine multiple data sets which respectively consist of data to be clustered with same exact matching information.

The clustering center determination portion 130 is configured to determine a clustering center according to the amount of the data to be clustered in each of the multiple data sets.

The target cluster acquisition portion 140 is configured to cluster the multiple data to be clustered according to the clustering center to obtain target clusters.

According to the embodiments, multiple data to be clustered can be acquired, multiple data sets which respectively consist of data to be clustered with the same exact matching information can be determined, then a clustering center can be determined according to the amount of the data to be clustered in each of the multiple data sets, and the multiple data to be clustered can be clustered according to the clustering center to obtain target clusters. Since the multiple data sets each consisting of the data to be clustered with the same exact matching information can be determined and the clustering center can be determined according to the amount of the data to be clustered in each of the multiple data sets, unreasonable determination of the clustering center can be improved, and accuracy of a clustering algorithm may further be improved.

Figure 6:
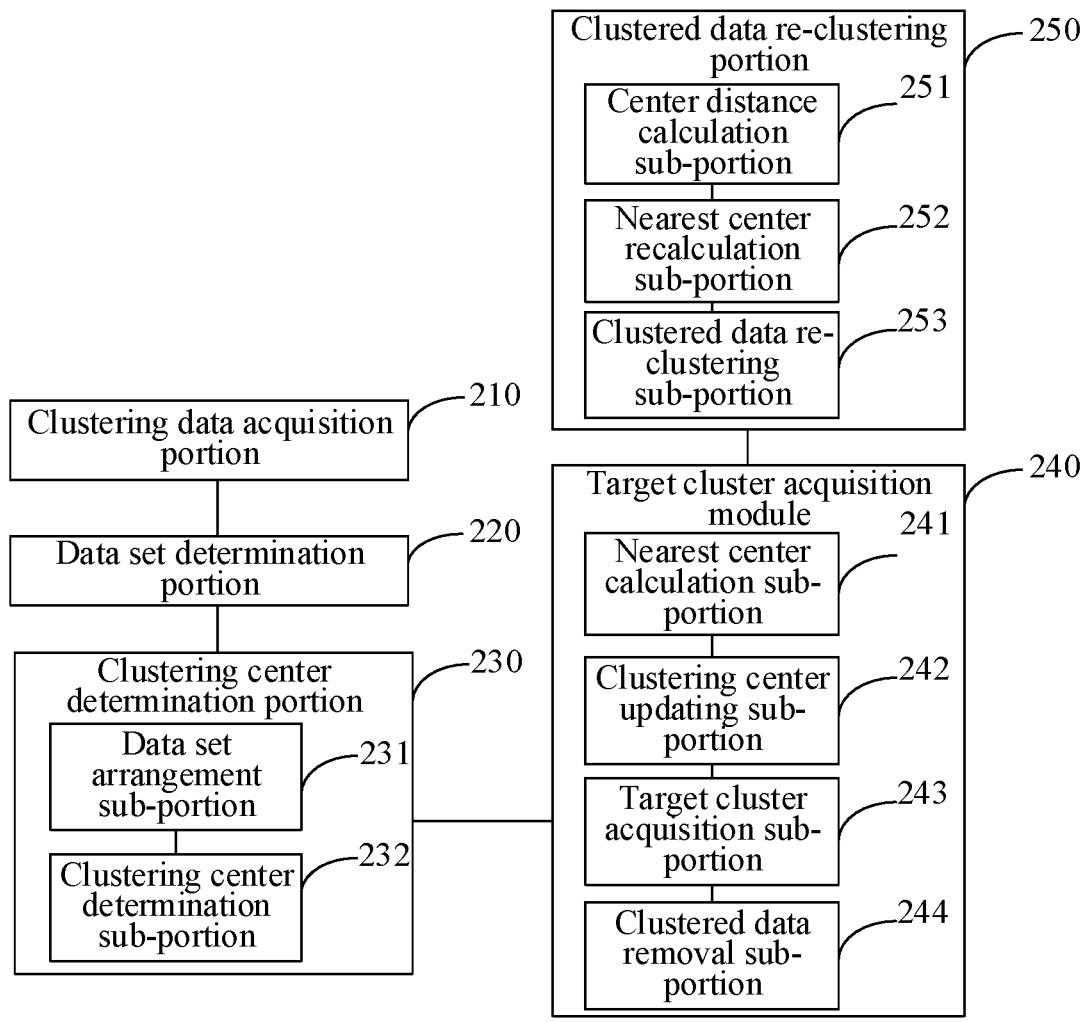
FIG. 6 is a block diagram of a clustering device according to another some embodiments of the present disclosure.

FIG. 6 is a block diagram of a clustering device according to another some embodiments of the present disclosure. A clustering data acquisition portion 210, a data set determination portion 220, a clustering center determination portion 230 and a target cluster acquisition portion 240 have the same functions as the clustering data acquisition portion 110, data set determination portion 120, clustering center determination portion 130 and target cluster acquisition portion 140 of the embodiments shown in FIG. 5 and will not be elaborated herein. As shown in FIG. 6, the clustering center determination portion 230 may include:

a data set arrangement sub-portion 231, configured to arrange the multiple data sets according to a sequence from large to small amounts of the data to be clustered in the multiple data sets; and a clustering center determination sub-portion 232, configured to determine clustering centers of the first N arranged data sets as the clustering center.

In some embodiments, the target cluster acquisition portion 240 may include:

a nearest center calculation sub-portion 241, configured to calculate a nearest center corresponding to each of the multiple data to be clustered based on the clustering center;

a clustering center updating sub-portion 242, configured to update the clustering center according to a calculation result about the nearest center; and a target cluster acquisition sub-portion 243, configured to re-execute the operation of calculating a nearest center corresponding to each of the multiple data to be clustered based on the clustering center until an ending condition for clustering iteration is met.

In some embodiments, the data to be clustered may further include fuzzy matching information; and the nearest center calculation sub-portion 241 may further be configured to:

calculate the nearest center corresponding to an information vector of each of the multiple data to be clustered based on an information vector of the clustering center, the information vector being generated based on the exact matching information and fuzzy matching information of the data to be clustered.

In some embodiments, the target cluster acquisition portion 240 may further include:

a clustered data removal sub-portion 244, configured to remove, from the target clusters, clustered data at a distance larger than or equal to a preset distance threshold away from the clustering center.

In some embodiments, the device may further include a clustered data re-clustering portion 250, and the clustered data re-clustering portion 250 may include:

a center distance calculation sub-portion 251, configured to calculate a distance between the removed clustered data and each clustering center;

a nearest center recalculation sub-portion 252, configured to recalculate the nearest center corresponding to the removed clustered data; and a clustered data re-clustering sub-portion 253, configured to, when a target distance between the recalculated nearest center and the removed clustered data is smaller than the preset distance threshold, distribute the removed clustered data to a cluster corresponding to the recalculated nearest center.

In some embodiments, the clustered data re-clustering sub-portion 253 may further be configured to, when the target distance is larger than or equal to the preset distance threshold, distribute the removed clustered data to a new cluster.

In some embodiments, the data to be clustered may include program stack information.

Figure 7:
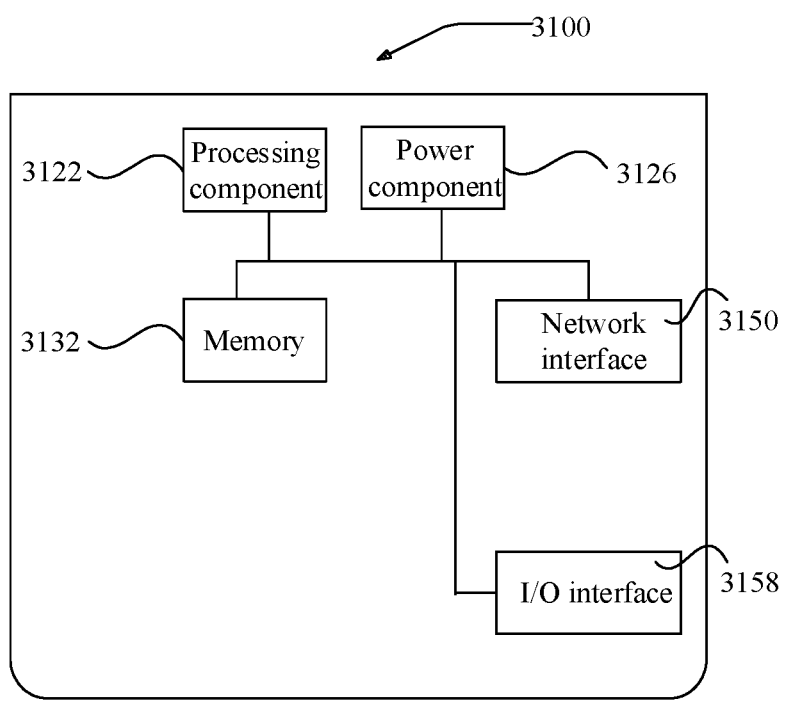
FIG. 7 is a structure diagram of a clustering device according to some embodiments of the present disclosure.

FIG. 7 is a structure diagram of a clustering device according to some embodiments of the present disclosure. The device 3100 can be provided as an application server or an intelligent terminal. As shown in FIG. 7, the device 3100 includes a processing component 3122 which further includes one or more processors, and a memory resource represented by a memory 3132 configured to store instructions, such as an application program, executable for the processing component 3122. The application program stored in the memory 3132 may include one or more than one portion of which each corresponds to a set of instructions. In addition, the processing component 3122 is configured to execute the instructions to execute the above-mentioned clustering method.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

The device 3100 may further include a power component 3126 configured to execute power management of the device 3100, a wired or wireless network interface 3150 configured to connect the device 3100 to a network and an Input/Output (I/O) interface 3158. The device 3100 can be operated based on an operating system stored in the memory 3132, for example, Windows Server™, Max OS X™, Unix™, Linux™, FreeBSD™ or the like.

Details about an implementation process of a function and effect of each sub-portion in the device may refer to the implementation process of the corresponding step in the method and elaborations are omitted herein.

The device embodiments substantially correspond to the method embodiments, and thus related parts refer to part of descriptions of the method embodiments. The device embodiments described above are only schematic examples, and sub-portions described as separate parts therein may or may not be physically separated, and parts displayed as sub-portions may or may not be physical sub-portions, namely, can be located in the same place or may also be distributed to multiple network sub-portions. Part or all of the portions therein can be selected according to a practical requirement to achieve the objective of the solutions of the present disclosure. Those of ordinary skill in the art may understand and implement without creative work.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described.

Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A clustering method, comprising:
acquiring multiple data to be clustered, each of the multiple data to be clustered comprising exact matching information;
determining multiple data sets each consisting of data to be clustered with same exact matching information;
determining a clustering center according to the amount of the data to be clustered in each of the multiple data sets; and
clustering the multiple data to be clustered according to the clustering center to obtain target clusters:
wherein determining the clustering center according to the amount of the data to be clustered in each of the multiple data sets comprises:
arranging the multiple data sets according to a sequence from large to small amounts of the data to be clustered in the multiple data sets; and
determining clustering centers of first N arranged data sets as the clustering centers.

2. The clustering method of claim 1, wherein clustering the multiple data to be clustered according to the clustering center comprises:
calculating, based on the clustering center, a nearest center corresponding to each of the multiple data to be clustered to obtain all nearest centers corresponding to the multiple data to be clustered;
updating the clustering centers according to a calculation result about the nearest centers; and
re-executing the operation of calculating, based on the clustering center, a nearest center corresponding to each of the multiple data to be clustered until an ending condition for clustering iteration is met.

3. The clustering method of claim 2, wherein each of the multiple data to be clustered further comprises fuzzy matching information; and
calculating, based on the clustering center, the nearest center corresponding to each of the multiple data to be clustered comprises:
calculating the nearest center corresponding to an information vector of each of the multiple data to be clustered based on an information vector of the clustering center,
wherein the information vector is generated based on the exact matching information and the fuzzy matching information of each of the multiple data to be clustered.

4. The clustering method of claim 1, further comprising:
removing, from each target cluster, clustered data at a distance larger than or equal to a preset distance threshold away from a respective clustering center.

5. The clustering method of claim 4, further comprising:
calculating a distance between the removed clustered data and each clustering center;
recalculating a nearest center corresponding to the removed clustered data; and
responsive to that a target distance between the recalculated nearest center and the removed clustered data is smaller than the preset distance threshold, distributing the removed clustered data to a cluster corresponding to the recalculated nearest center.

6. The clustering method of claim 4, further comprising:
responsive to that the target distance is larger than or equal to the preset distance threshold, distributing the removed clustered data to a new cluster;
wherein each of the multiple data to be clustered further comprises program stack information.

7. The clustering method of claim 1, further comprising:
presenting information to a user based on the target clusters;
wherein clustered data at a distance larger than or equal to a preset distance threshold away from the clustering center are removed from the target clusters, to improve accuracy of the data in the target clusters;
a distance between the removed clustered data and each clustering center is calculated;
a nearest center corresponding to the removed clustered data is recalculated;
upon the target distance between the recalculated nearest center and the removed clustered data being smaller than the preset distance threshold, the removed clustered data are distributed to the cluster corresponding to the recalculated nearest center; and
upon the target distance being larger than or equal to the preset distance threshold, the removed clustered data are distributed to a new cluster, such that clustering accuracy is further improved.

8. A clustering device, comprising:
a processor; and
a memory configured to store instructions executable by the processor,
wherein the processor is configured to:
control a network interface to acquire multiple data to be clustered, each of the multiple data to be clustered comprising exact matching information;
determine multiple data sets each consisting of data to be clustered with same exact matching information;
arrange the multiple data sets according to a sequence from large to small amounts of the data to be clustered in the multiple data sets; and determine clustering centers of first N arranged data sets as the clustering centers; and cluster the multiple data to be clustered according to the clustering center to obtain target clusters.

9. The clustering device of claim 8, wherein the processor is further configured to:

calculate a nearest center corresponding to each of the multiple data to be clustered based on the clustering center to obtain all nearest centers corresponding to the multiple data to be clustered;

update the clustering centers according to a calculation result about the nearest centers; and re-execute the operation of calculating a nearest center corresponding to each of the multiple data to be clustered based on the clustering center until an ending condition for clustering iteration is met.

10. The clustering device of claim 9, wherein each of the multiple data to be clustered further comprises fuzzy matching information; and the processor is further configured to:

calculate the nearest center corresponding to an information vector of each of the multiple data to be clustered based on an information vector of the clustering center, the information vector being generated based on the exact matching information and fuzzy matching information of each of the multiple data to be clustered.

11. The clustering device of claim 8, wherein the processor is further configured to:

remove, from each target cluster, clustered data at a distance larger than or equal to a preset distance threshold away from a respective clustering center.

12. The clustering device of claim 11, wherein the processor is further configured to:

calculate a distance between the removed clustered data and each clustering center;

recalculate a nearest center corresponding to the removed clustered data; and when a target distance between the recalculated nearest center and the removed clustered data is smaller than the preset distance threshold, distribute the removed clustered data to a cluster corresponding to the recalculated nearest center.

13. The clustering device of claim 11, wherein the processor is further configured to, when the target distance is larger than or equal to the preset distance threshold, distribute the removed clustered data to a new cluster.

14. The clustering device of claim 8, wherein each of the multiple data to be clustered further comprises program stack information.

15. A non-transitory computer-readable storage medium having a program stored thereon for execution by a processor of a terminal to enable the terminal to implement operations of:

acquiring multiple data to be clustered, each of the multiple data to be clustered comprising exact matching information;

determining multiple data sets consisting of data to be clustered with same exact matching information;

arranging the multiple data sets according to a sequence from large to small amounts of the data to be clustered in the multiple data sets; and determining clustering centers of first N arranged data sets as the clustering centers; and clustering the multiple data to be clustered according to the clustering center to obtain target clusters.

16. The non-transitory computer-readable storage medium of claim 15, wherein the program is for further execution by the processor to implement operations of:

calculating, based on the clustering center, a nearest center corresponding to each of the multiple data to be clustered to obtain all nearest centers corresponding to the multiple data to be clustered;

updating the clustering centers according to a calculation result about the nearest centers; and re-executing the operation of calculating based on the clustering center a nearest center corresponding to each of the multiple data to be clustered until an ending condition for clustering iteration is met.

17. The non-transitory computer-readable storage medium of claim 16, wherein each of the multiple data to be clustered further comprises fuzzy matching information; and the program is for further execution by the processor to implement operations of:

calculating the nearest center corresponding to an information vector of each of the multiple data to be clustered based on an information vector of the clustering center, wherein the information vector is generated based on the exact matching information and the fuzzy matching information of each of the multiple data to be clustered.

* * * * *